United States Patent
Anderson et al.

(10) Patent No.: US 6,945,489 B2
(45) Date of Patent: Sep. 20, 2005

(54) SPLICING TAPE FOR ATTACHING A LEADER TAPE TO DATA TAPE

(75) Inventors: James C. Anderson, Eagle, ID (US); Robert C. Aaron, Boise, ID (US); Paul W. Poorman, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 10/643,793

(22) Filed: Aug. 19, 2003

(65) Prior Publication Data

US 2005/0040273 A1 Feb. 24, 2005

(51) Int. Cl.⁷ .............................................. G03B 23/02
(52) U.S. Cl. ................................... 242/348; 242/332.4
(58) Field of Search .............................. 242/332.4, 341, 242/348, 348.2, 348.3, 532.3, 556, 556.1; 360/132, 134

(56) References Cited

U.S. PATENT DOCUMENTS

| | | | |
|---|---|---|---|
| 4,110,142 A | * | 8/1978 | Tall |
| 5,326,045 A | | 7/1994 | Konshak et al. |
| 5,332,173 A | * | 7/1994 | Kubota et al. ........... 242/348.3 |
| 5,845,860 A | * | 12/1998 | Tohjo et al. ................. 242/348 |
| 5,883,771 A | | 3/1999 | Hoerger |
| 6,003,802 A | * | 12/1999 | Eaton et al. .............. 242/332.4 |
| 6,057,994 A | | 5/2000 | Hoerger |
| 6,135,379 A | * | 10/2000 | Argumedo ................ 242/348.2 |
| 6,227,475 B1 | | 5/2001 | McAllister et al. |
| 6,332,584 B1 | * | 12/2001 | Bakeman, Jr. .............. 242/348 |
| 6,499,684 B2 | | 12/2002 | Eaton et al. |
| 6,563,659 B1 | | 5/2003 | Fasen |
| 6,568,617 B1 | * | 5/2003 | Rambosek ................ 242/332.4 |
| 2003/0019968 A1 | | 1/2003 | Masuda |
| 2003/0026021 A1 | | 2/2003 | Goodman et al. |
| 2003/0075635 A1 | | 4/2003 | Tsuchiya et al. |
| 2003/0089809 A1 | | 5/2003 | Mackawa et al. |
| 2003/0094528 A1 | | 5/2003 | Hiraguchi |

OTHER PUBLICATIONS

ECMA Standardizing Information and Communication Systems, "Data Interchange on 12, 7 mm 384–Track Magnetic Tape Cartridges–Ultrium–1 Format," pp. 1–59 (Jun. 2001).

* cited by examiner

Primary Examiner—William A. Rivera

(57) ABSTRACT

A tape cartridge includes a reel and a data tape to store data. The data tape is wound on the reel and has side edges. The tape cartridge further comprises a leader tape, and a splicing tape to link the leader tape to the data tape. The splicing tape has an edge with a slanted portion that is slanted with respect to the side edges of the data tape.

24 Claims, 2 Drawing Sheets

SPLICING TAPE FOR ATTACHING A LEADER TAPE TO DATA TAPE

BACKGROUND

A widely used storage medium for storing data is tape, such as magnetic or optical tape. Storage tapes can be mounted in various types of tape cassettes or cartridges. One type of tape cassette or cartridge is a two-reel or two-spindle cassette or cartridge in which the tape is housed entirely within the cassette or cartridge. One end of the tape is attached to a first reel, while another end of the tape is attached to a second reel. The cassette or cartridge is loaded into a tape drive, which includes a tape head that engages the tape to read data from or record data to the tape as the tape is wound from one reel to the other.

Alternatively, a single-reel or single-spindle tape cartridge can be used in which the cartridge has one reel or spindle. A single-reel cartridge is generally more space efficient than two-reel tape cassettes or cartridges. In a single-reel design, the source reel is located in the tape cartridge but a take-up reel is located outside of the cartridge in the tape drive.

Once a single-reel cartridge is loaded into a tape drive, the tape drive typically uses a picker or leader block to remove an end of the tape from the cartridge. The tape is then mounted onto the take-up reel inside the tape drive, and the tape is then wound from the source reel to the take-up reel. The tape end to be drawn into the tape drive is secured to an element referred to as leader pin. There are different designs of leader pins that can be employed. One such leader pin design is a leader pin assembly that conforms to a version of the Ultrium Standard, described in "Data Interchange on 12, 7 mm 384-Track Magnetic Tape Cartridges—Ultrium-1 Format," Standard ECMA-319 (June 2001).

The tape in a single-reel cartridge includes a leader tape and data tape (for storing data), with the leader tape attached to the leader pin assembly. The leader tape is linked or coupled to the data tape by a piece of splicing tape. Generally, the leader tape is thicker than the data tape to provide strength during threading operation so that the leader tape does not break. The splicing tape is also a relatively thick tape (usually thicker than even the leader tape). As a result, abrupt transitions in tape thickness occurs at the edges of the splicing tape and at the transition from the leader tape to the data tape. As the tape is wound onto the take-up reel in the tape drive, the abrupt thickness transitions cause an imprint of bumps in the roundness of the tape pack (which includes the multiple wraps of tape that are wound onto the take-up reel). The bumps usually extend through many layers of tape, often through the entire tape pack on the take-up reel. As the tape is spooled off of the take-up reel at the end of a rewind cycle, the imprinted bumps may cause physical excitation in the tape. The physical excitation in the tape causes undesirable movement of the tape. This movement is detected by tape drive circuitry and indicated by position error signals (PES) that are used by the tape head of the tape drive to compensate for the undesirable movement of the tape.

DETAILED DESCRIPTION

Figure 1:
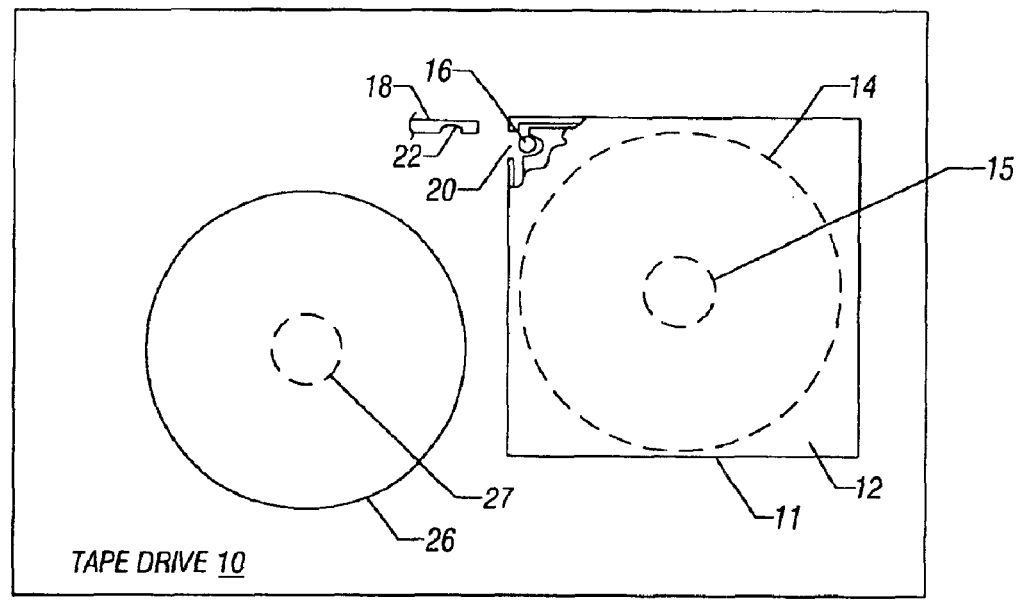
FIGS. 1 and 2 illustrate a portion of a tape drive that includes a leader block and a take-up reel for receiving tape from a tape cartridge.
Figure 2:
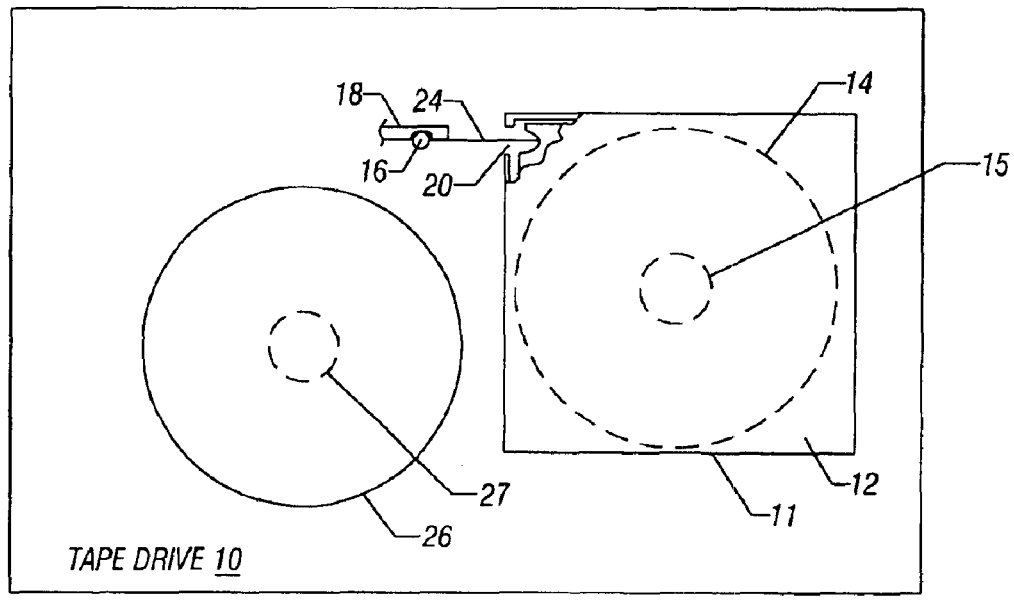

FIGS. 1 and 2 illustrate portions of an example tape drive 10 that is capable of receiving a tape cartridge 12 according to some embodiments. The tape cartridge 12 includes a housing 11 that contains a source reel 14 on which is wound a storage tape (labeled 24 in FIG. 2). A "storage tape" refers to a storage medium (such as a magnetic or optical storage medium) that is generally a narrow strip of relatively long length. The storage tape is formed of a material (e.g., magnetic or optical material) to enable the tape to store data. The storage tape has several portions, including a data tape for storing data and a leader tape for attaching the storage tape to a leader pin 16. As used here, "data" refers to various types of information, including user data, program data, program instructions, and other forms of information. The leader pin 16 is shown in its retracted position in FIG. 1. The leader pin 16 is positioned in close proximity to an opening 20 of the tape cartridge 12.

The tape drive 10 includes a leader block 18 (according to one example) that is insertable through the opening 20 to engage the leader pin 16. The leader block 18 has a first profile 22 (a notch in the example shown) for receiving the leader pin 16 once the leader block 18 is provided through the tape cartridge opening 20 to the position of the leader pin 16. As further shown in FIG. 2, once the leader block 18 is engaged with the leader pin 16, the leader block 18 is moved by the tape drive 10 to pull the leader pin 16, along with attached storage tape 24, out of the tape cartridge 12. The leader block 18 and the attached leader pin 16 are moved to a location of a take-up reel 26 in the tape drive 10. The leader block 18 is engaged with the hub 27 of the take-up reel 26, which enables the storage tape 24 to be wound onto the take-up reel 26. As the tape is wound onto the take-up reel 26, a tape head (not shown) in the tape drive 10 reads data from or records data onto the tape 24. The source reel 14 and the take-up reel 26 rotate about their respective hubs 15 and 27. In other embodiments, other arrangements of the tape drive can be employed.

Figure 3:
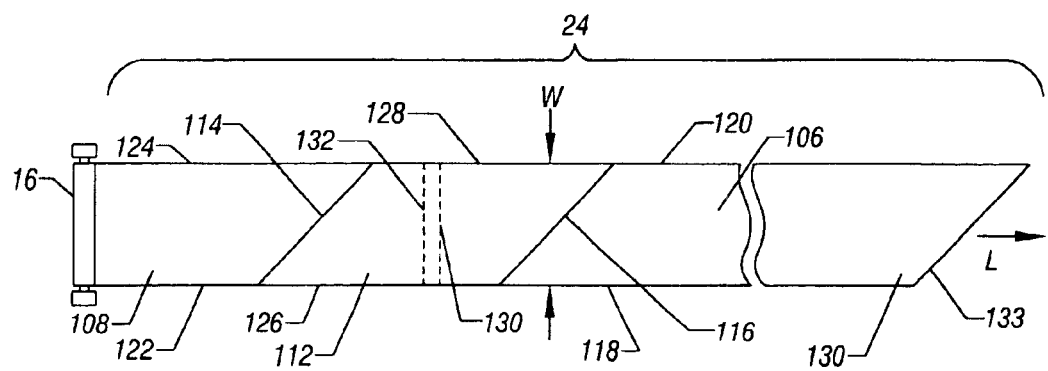
FIGS. 3–5 illustrate different splicing techniques for attaching a leader tape to a data tape in a tape cartridge.

FIG. 3 illustrates in greater detail the storage tape 24 of the single-reel tape cartridge 12 according to a first embodiment. The storage tape 24 includes a data tape 106 and a leader tape 108 that has one end portion attached to the leader pin 16. The other end portion of the leader tape 108 is adhesively attached to a splicing tape 112. An end portion of the data tape 106 is also adhesively attached to the splicing tape 112. The data tape 106 and leader tape 108 extend along a longitudinal axis labeled as L. In one implementation, the splicing tape 112 has a width W that is generally the same as the width of each of the leader tape 108 and the data tape 106. In addition, the splicing tape 112 has slanted edges 114 and 116 that are slanted with respect to side edges 126 and 128 of the splicing tape 112. The slanted edges 114 and 116 of the splicing tape 112 are also slanted with respect to the side edges 118 and 120 of the data tape 106 and with respect to the side edges 122 and 124 of the leader tape 108. The slanted edges of the splicing tape 112 are thus effectively at a non-zero and non-perpendicular angle (not 0° and not 90°) with respect to the side edges of the data tape 106 and leader tape 108.

In the illustrated embodiment of FIG. 3, the slanted edges 114 and 116 of the splicing tape 112 are generally parallel with respect to each other. However, in other embodiments, the slanted edges are not parallel, and in fact can be at different angles with respect to the side edges 126 and 128.

The respective side edges of the data tape 106, leader tape 108, and splicing tape 112 are generally parallel to the longitudinal axis L of the storage tape 24. The slanted arrangement of the slanted edges 114 and 116 with respect to the side edges of the data tape 106 and the leader tape 108 reduces or eliminates the occurrence of bumps upon winding of the storage tape 24 onto the take-up reel 26 (FIG. 1) of the tape drive 10. In conventional tape cartridges, the splicing tape has end edges that are perpendicular to the side edges of the storage tape (rather than the slanted edges of the splicing tape discussed herein). The right-angled end edges of the splicing tape cause abrupt transitions in thickness that occur at the end edges of the conventional splicing tape and at the border between the leader tape and data tape. The abrupt thickness transitions can cause bumps to be imprinted through layers of the tape pack wound onto the take-up reel. In one example implementation, the data tape 106 is about 9 micrometers ($\mu$m) thick, the leader tape 108 is about 17 $\mu$m thick, and the splicing tape 112 is about 22 $\mu$m thick. The difference in thicknesses between the leader tape and data tape, in conjunction with the relatively large thickness of the splicing tape, cause sudden steps in the thickness of the storage tape 24

However, by using the splicing tape with slanted edges according to some embodiments of the invention, the thickness transitions are made more gradual, which reduces or eliminates the bump that appears in the tape pack on the take-up reel 26. By reducing or eliminating the bumps, negative effects associated with physical excitation of the storage tape 24 during rewind of the storage tape from the take-up reel 26 back to the source reel 14 are reduced or eliminated. By reducing physical excitation of the storage tape 24 during rewind, the negative effects on position error signals (PES) are also reduced or eliminated. PES are used by the tape head of the tape drive to adjust for unwanted movement of the storage tape.

As tape thicknesses gradually decrease (such as from about 9 $\mu$m to about 6 $\mu$m, according to one example), the amount of tape that can be present in a cartridge and wound onto the take-up reel 26 (FIG. 1) is increased. The issue associated with imprinting bumps associated with the sharp thickness transitions is made worse with thinner tape designs. If unresolved, the bump imprinting issue may cause spacing between tracks on the data tape or the speed of the data tape to be sub-optimal.

As further shown in FIG. 3, the data tape 106 has a first end edge 130 that is held in close proximity to an end edge 132 of the leader tape 108 by the splicing tape 112. In the arrangement of FIG. 3, the end edges 130 and 132 are generally perpendicular to the side edges of the data and leader tapes 106 and 108. A slight gap is present between the end edges 130 and 132 in the arrangement shown in FIG. 3. However, in other arrangements, the end edges 130 and 132 can be held in closer proximity to each other (such that the end edges 130 and 132) are in contact. Alternatively, the end edges 130 and 132 can be held further apart.

The first end edge 130 of the data tape 106 is part of a first end portion of the data tape 106 that is attached to the splicing tape 112. The second end portion 130 of the data tape 106 is mounted onto the source reel 14 (FIG. 1). Usually, during assembly of the tape cartridge, the second end portion 130 of the data tape 106 is simply placed onto the surface of the cylindrical hub 15 of the source reel 14. In some cases, deionized water or alcohol is applied to the contact surface of the second end portion 130 of the data tape 106 to enable adhesion to the surface of the source reel hub 15. Once the end portion 130 is mounted onto the source reel hub 15, the data tape 106 is wound around the hub 15 until the entire tape pack is wound onto the source reel 14. To reduce or eliminate the imprinting of a bump into the tape pack on the source reel 14, the end edge 133 at the end portion 130 is also cut to have a slanted arrangement with respect to the side edges 118 and 120 of the data tape 106.

The slanted end edge 133 of the data tape 106 provides a more gradual transition to reduce or eliminate the imprinted bump into the rest of the tape pack that is wound onto the source reel 14.

Figure 4:
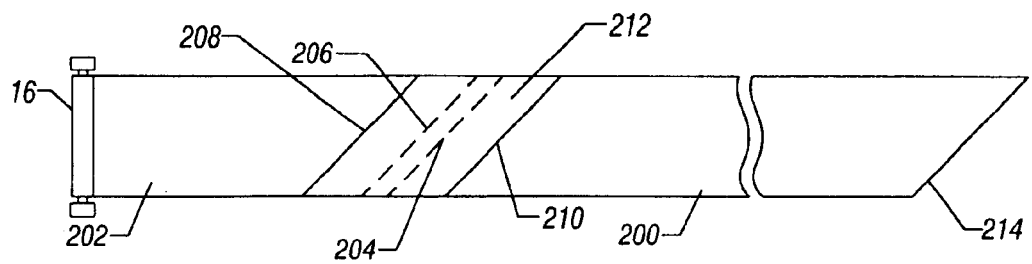

According to another embodiment, shown in FIG. 4, a data tape 200 and a leader tape 202 are also spliced together by a splicing tape 212 that has slanted edges 208 and 210. However, the data tape 200 and leader tape 202 differ from the data tape 106 and leader tape 108 of FIG. 3 in that the end edges 204 and 206 of the data and leader tapes 200 and 202, respectively, are also slanted. The combination of the slanted end edges 204 and 206 of the data and leader tapes 200 and 202 and the slanted edges 208 and 210 of the splicing tape 212 provides an even more gradual thickness transitions than the arrangement shown in FIG. 3. In the embodiment of FIG. 4, the end edge 214 of the data tape 200 that is in contact with the source reel hub 15 (FIG. 1) is also slanted.

Figure 5:
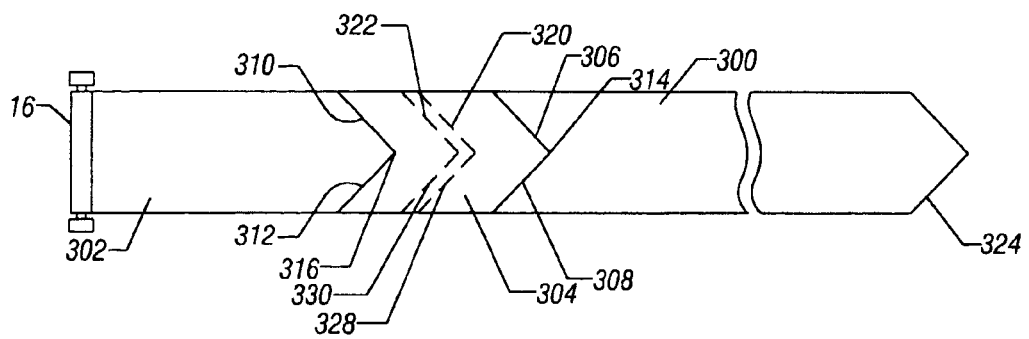

Another embodiment of a storage tape is shown in FIG. 5, which includes a data tape 300 held in position relative to a leader tape 302 by a splicing tape 304 that has generally V-shaped end edges (with slanted edge portions 306 and 308 forming a first V-shaped edge and slanted edge portions 310 and 312 forming a second V-shaped edge). The slanted edge portions 306 and 308 meet at a point 314, while the slanted edge portions 310 and 312 meet at a point 316. The ends 320 and 322 of the data tape 300 and the leader tape 302, respectively, that are proximate to each other are also generally V-shaped and follow the general contours defined by the slanted edges portions 306, 308, 310, and 312 of the splicing tape 304.

The end edge 324 of the data tape 300 that is contacted to the source reel hub 15 (FIG. 1) is also cut to form a generally V-shaped edge. Note, however, that although each of the embodiments of FIGS. 3, 4, and 5 has an end edge 133, 214, or 324, with a portion that is slanted or inclined in some manner with respect to side edges of the data tape, the inclined or slanted end edge feature is optional and is not included in other embodiments. Also, in other embodiments, instead of slanted edges or edge portions that are generally straight, as shown in FIGS. 3–5, the edges or edge portions can have curved shapes. Thus, an edge or edge portion is "slanted" with respect to side edges of a data tape or leader tape if the general contour of the edge or edge portion is slanted with respect to the side edges.

In other embodiments, instead of using a splicing tape to splice a leader tape to a data tape, the leader tape can be attached to the data tape. The end edges of the leader tape and data tape that are in proximity to each other can also be slanted in the manner discussed above.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A tape cartridge comprising:

a reel;

a data tape to store data, the data tape being wound on the reel and having side edges;

a leader tape; and a splicing tape to link the leader tape to the data tape, the splicing tape having an edge with a slanted portion that is slanted with respect to the side edges of the data tape, wherein the data tape has a first end portion attached to the splicing tape and the leader tape has an end portion attached to the splicing tape, the first end portion of the data tape having a first end edge generally perpendicular to the side edges of the data tape, and the end portion of the leader tape having an end edge generally parallel to the first end edge of the data tape, wherein the data tape has a second end portion having a second end edge, the second end edge being slanted with respect to the side edges of the data tape.

2. The tape cartridge of claim 1, wherein the leader tape has side edges, and wherein the slanted portion of the edge of the splicing tape is slanted with respect to the side edges of the leader tape.

3. The tape cartridge of claim 2, wherein the data tape has a longitudinal axis extending along a length of the data tape, and wherein the side edges are generally parallel to the longitudinal axis.

4. The tape cartridge of claim 3, wherein the splicing tape has another edge with a slanted portion that is slanted with respect to the side edges of the leader tape and data tape.

5. The tape cartridge of claim 1, wherein the reel has a hub, the second end portion of the data tape contacted to a surface of the hub.

6. The tape cartridge of claim 1, wherein the second end portion of the data tape is mounted on the reel.

7. A tape cartridge comprising:

a reel;

a data tape to store data, the data tape being wound on the reel and having side edges;

a leader tape; and a splicing tape to link the leader tape to the data tape, the splicing tape having an edge with a slanted portion that is slanted with respect to the side edges of the data tape, wherein the data tape has a first end portion attached to the splicing tape, the first end portion of the data tape having a first edge slanted with respect to the side edges of the data tape.

8. The tape cartridge of claim 7, further comprising:

a housing containing the reel; and a leader pin attached to the leader tape, the leader pin adapted to be removed from the housing.

9. The tape cartridge of claim 8, wherein the housing has an opening through which the leader pin is adapted to pass through during removal of the leader pin from the housing.

10. The tape cartridge of claim 7, wherein the leader tape has side edges and an end portion attached to the splicing tape, the end portion of the leader tape having an edge slanted with respect to the side edges of the leader tape.

11. A tape cartridge comprising:

a reel;

a data tape to store data, the data tape being wound on the reel and having side edges;

a leader tape; and a splicing tape to link the leader tape to the data tape, the splicing tape having an edge with a slanted portion that is slanted with respect to the side edges of the data tape, wherein the edge of the splicing tape is generally V-shaped.

12. The tape cartridge of claim 11, wherein the data tape has a first end portion attached to the splicing tape, the first end portion of the data tape having a first edge that is generally V-shaped.

13. The tape cartridge of claim 12, wherein the leader tape has an end portion attached to the splicing tape, the end portion of the splicing tape having an edge that is generally V-shaped.

14. The tape cartridge of claim 11, wherein the data tape has an end portion mounted onto a hub of the source reel, the end portion of the data tape having an edge that is generally V-shaped.

15. A tape drive comprising:

a take-up reel; and a tape cartridge removably mounted in the tape drive, the tape cartridge comprising:

a source reel;

a data tape to store data, the data tape being wound on the source reel and having side edges;

a second tape having side edges; and a splicing tape to couple the second tape to the data tape, the splicing tape having an edge with a portion that is at an inclined angle with respect to the side edges of the data tape, wherein the data tape has an end portion with an edge and the second tape has an end portion with an edge, the end portion edge of the data tape being inclined with respect to the side edges of the data tape, and the end portion edge of the second tape being inclined with respect to the side edges of the second tape, the end portion edge of the data tape being held in proximity to the end portion edge of the second tape by the splicing tape.

16. The tape drive of claim 15, wherein the tape cartridge further comprises a leader pin attached to the second tape, the tape drive further comprising a mechanism to withdraw the leader pin from the tape cartridge.

17. The tape drive of claim 15, wherein the data tape comprises one of a magnetic and optical storage medium.

18. A method comprising:

providing a tape cartridge having a reel and a storage tape mounted on the reel, the storage tape to store data;

providing a splicing tape to link plural tape portions of the storage tape, the splicing tape having side edges generally parallel to a longitudinal axis of the storage tape; and providing an end edge of the splicing tape, the end edge having a portion that is generally V-shaped.

19. The method of claim 18, wherein providing the splicing tape comprises providing a splicing tape to link a leader tape to a data tape.

20. A method comprising:

providing a tape cartridge having a reel and a storage tape mounted on the reel, the storage tape to store data, the storage tape having a leader tape and a data tape;

providing a splicing tape to link the leader tape to the data tape, the splicing tape having side edges generally parallel to a longitudinal axis of the storage tape;

providing an end edge of the splicing tape, the end edge having a portion slanted with respect to the side edges;

attaching a first end portion of the data tape to the splicing tape; and providing a slanted edge at a second end portion of the data tape that is mounted onto the reel.

21. The method of claim 20, further comprising:
attaching an end portion of the leader tape to the splicing tape;
providing a slanted edge at the first end portion of the data tape; and
providing a slanted edge at the end portion of the leader tape.

22. The method of claim 21, wherein providing the slanted edges at the first end portion and second end portion of the data tape comprises providing a slanted edge inclined with respect to side edges of the data tape, and
wherein providing the slanted edge at the end portion of the leader tape comprises providing a slanted edge inclined with respect to side edges of the leader tape.

23. A tape cartridge comprising:
a reel;
a data tape to store data, the data tape being wound on the reel and having side edges and a first end edge;
a leader tape having an end edge in close proximity to the first end edge of the data tape, each of the end edge of the leader tape and first end edge of the data tape being slanted with respect to the side edges of the data tape.

24. The tape cartridge of claim 23, wherein the data tape has a second edge mounted on the reel, the second edge being slanted with respect to the side edges of the data tape.

* * * * *